H. COOPER.
AUTOMATIC HEAD LAMP CONTROL.
APPLICATION FILED SEPT. 12, 1916.

1,221,687.

Patented Apr. 3, 1917.

Witnesses
Hugh H. Ott
R. M. Smith

Inventor
HARRY COOPER
By Victor J. Evans
Attorney

UNITED STATES PATENT OFFICE.

HARRY COOPER, OF GWINNER, NORTH DAKOTA.

AUTOMATIC HEAD-LAMP CONTROL.

1,221,687.     Specification of Letters Patent.     Patented Apr. 3, 1917.

Application filed September 12, 1916. Serial No. 119,739.

*To all whom it may concern:*

Be it known that I, HARRY COOPER, a citizen of the United States, residing at Gwinner, in the county of Sargent and State of North Dakota, have invented new and useful Improvements in Automatic Head-Lamp Controls, of which the following is a specification.

This invention relates to automatic head-lamp controls the broad object in view being to provide simple mechanism so associated with a pair of headlamps adapted to turn on vertical axes and the steering rod or shaft of the steering mechanism that when the hand control wheel of the machine is turned in either direction, the headlamps of the machine will be turned in a corresponding direction so as to illuminate that portion of the road which is about to be followed by the machine, the headlamps assuming practically the same angles as the steering wheels.

The invention relates particularly to the mechanism whereby the rotative movement of the steering rod or shaft is transmitted to the headlamps and adapted to be utilized in connection with practically every type of motor vehicle now in use.

With the above and other objects in view, the invention consists in the novel construction, combination and arrangement of parts, as herein described, illustrated and claimed.

In the accompanying drawings:—

Figure 1:
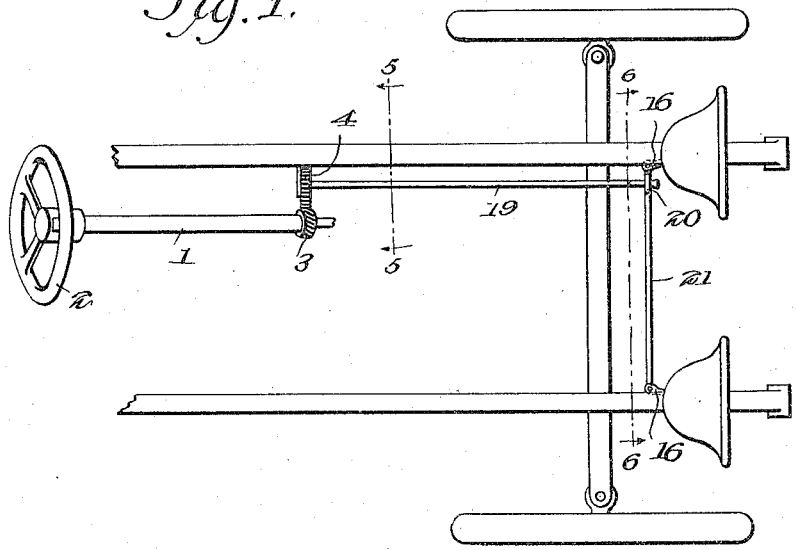
Figure 1 is a plan view showing the lamp turning mechanism of this invention in its applied relation to certain well known parts of a motor vehicle.
Figure 3:
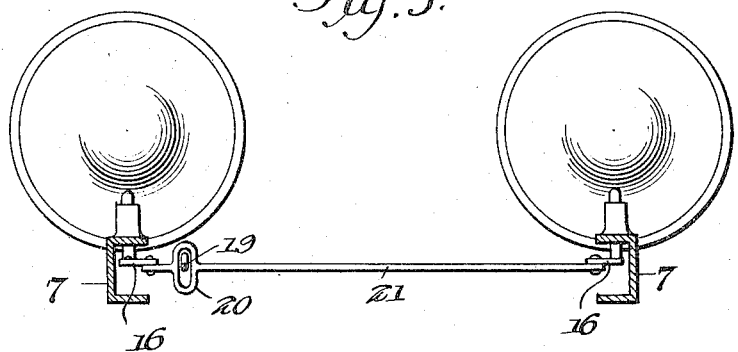
Fig. 3 is a vertical cross section on the line 6—6 of Fig. 1.
Figure 2:
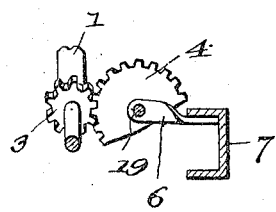
Fig. 2 is a cross section through the same on the line 5—5 of Fig. 1.

In the embodiment of this invention illustrated in Figs. 1, 2 and 3, the steering rod or shaft 1 which is operated by means of the usual hand controlling wheel 2 has mounted fast thereon a pinion 3 which meshes with a gear 4 shown in the form of a sector gear. The sector gear 4 is mounted in a bearing bracket 6 shown as secured to one of the side frame bars 7 of the machine although it will be apparent that said bracket 6 may be fastened to the stationary housing for the shaft 1 and constituting what is known as the steering column.

Each of the headlamps 13 is mounted on a lamp post 14 which is journaled to turn on a substantially vertical axis in a bearing member 15 secured to the frame of the machine by any convenient form of bracket.

The gear 4 has fixedly connected thereto a crank rod 19 the forward extremity of which is received in a vertically elongated slotted portion 20 of a connecting rod 21 which is pivotally attached at its opposite extremities to the lamp turning arms 16 hereinabove described.

Under the arrangement just described, the crank rod 19 moves to the left or to the right in accordance with the direction in which the hand wheel 2 is turned, at the same time the rod 19 plays upwardly and downwardly in the slotted portion 20 of the connecting rod 21 thereby causing said connecting rod to move to the right or to the left, imparting a corresponding movement to the headlamps which are thus turned to an angle corresponding substantially with the angles to which the steering wheels have been turned by the operator of the machine.

I claim:—

The combination with the steering shaft of a motor vehicle, of a pair of headlamps, posts therefor mounted to turn on substantially vertical axes, arms projecting from said posts, a rod connecting said arms, a gear on said steering shaft, a second gear meshing therewith and driven thereby, and a motion transmitting member connected at one end to said second gear and having its other end coöperating directly with said connecting rod for turning the lamps simultaneously with the steering wheels of the vehicle.

In testimony whereof I affix my signature.

HARRY COOPER.

Copies of this patent may be obtained for five cents each, by addressing the "Commissioner of Patents, Washington, D. C."